US012646501B1

(12) United States Patent
Qing et al.

(10) Patent No.: US 12,646,501 B1
(45) Date of Patent: Jun. 2, 2026

(54) AUTOMATED SUPPORT CENTER CALL CLASSIFICATION

(71) Applicant: Charter Communications Operating, LLC, St. Louis, MO (US)

(72) Inventors: Jing Qing, Castle Rock, CO (US); Michael Anthony Addonisio, Denver, CO (US); Christy Marie Gearheart, Crestwood, KY (US); Veronica Jean Rozmiarek Bloom, Centennial, CO (US); Brock Darrel Bose, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 205 days.

(21) Appl. No.: 18/469,298

(22) Filed: Sep. 18, 2023

(51) Int. Cl.
*G10L 15/01* (2013.01)
*G10L 15/06* (2013.01)
*G10L 15/08* (2006.01)

(52) U.S. Cl.
CPC ............ *G10L 15/063* (2013.01); *G10L 15/01* (2013.01); *G10L 15/08* (2013.01)

(58) Field of Classification Search
CPC ........ G10L 15/063; G10L 15/01; G10L 15/08
See application file for complete search history.

(56) References Cited

U.S. PATENT DOCUMENTS

| | | | |
|---|---|---|---|
| 11,735,158 B1* | 8/2023 | Gupta | G10L 13/027 704/259 |
| 2015/0033139 A1* | 1/2015 | Thiel | H04L 41/069 715/740 |
| 2018/0096065 A1* | 4/2018 | Sisodia | G06F 16/635 |
| 2023/0206925 A1* | 6/2023 | Havdan | G10L 17/18 704/200 |
| 2025/0077775 A1* | 3/2025 | Deng | G06F 40/56 |

OTHER PUBLICATIONS

Motitswane, O. G. (2023). Machine learning and deep learning techniques for natural language processing with application to audio recordings (Doctoral dissertation, North-West University (South Africa)).*

* cited by examiner

*Primary Examiner* — Bryan S Blankenagel
(74) *Attorney, Agent, or Firm* — Dority & Manning, P.A.

(57) ABSTRACT

A plurality of training inputs are obtained, each training input including information associated with a digitized voice signal recording including speech signals of a corresponding support call between a technician and a support representative providing support to the technician. A machine-learned support call classification model is trained using the training inputs to generate classification outputs indicative of a particular support call classification for each respective training input based on a loss function that evaluates a difference between the particular support call classification and a ground-truth support call classification associated with each respective training input.

20 Claims, 10 Drawing Sheets

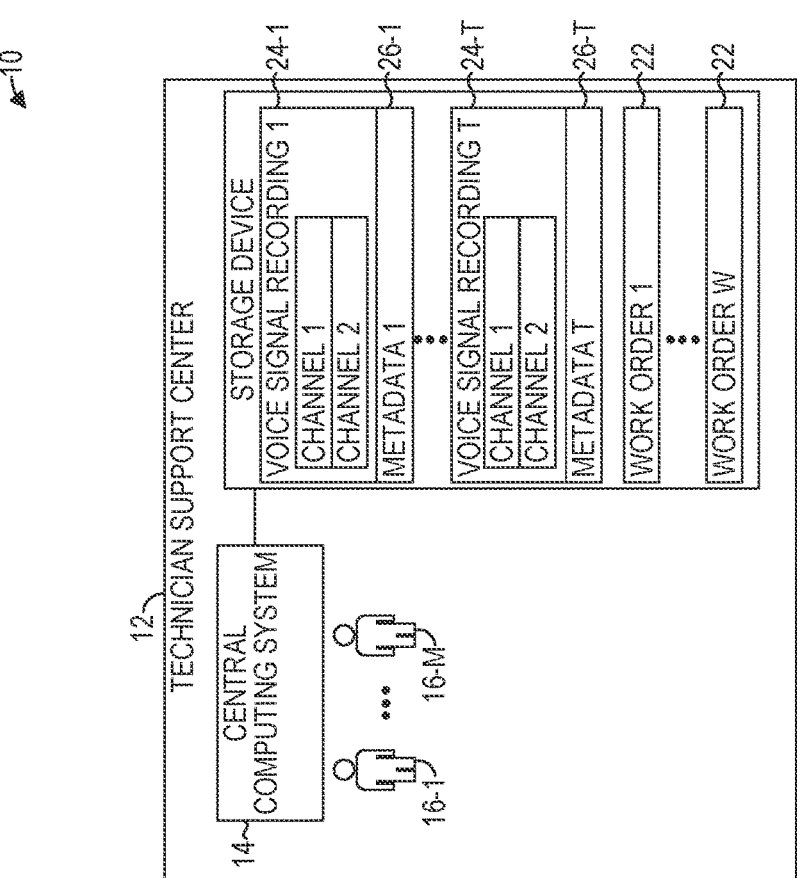
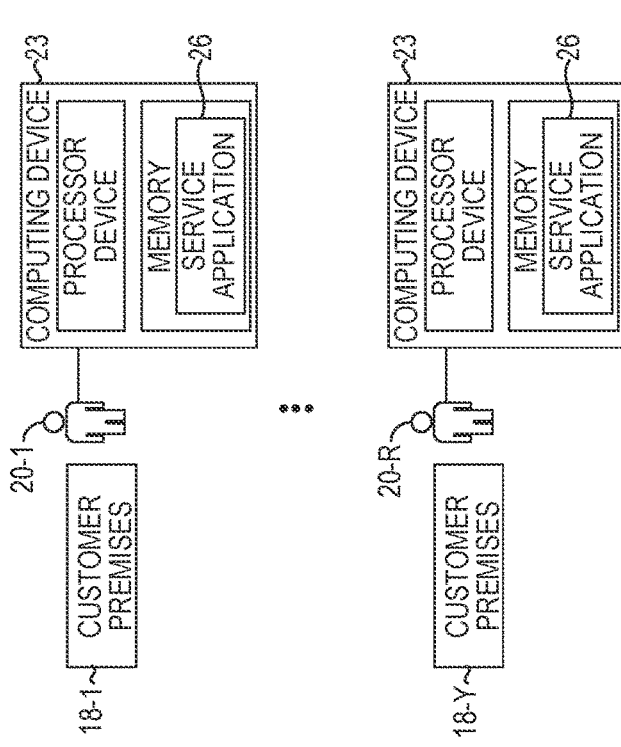
*FIG. 1*

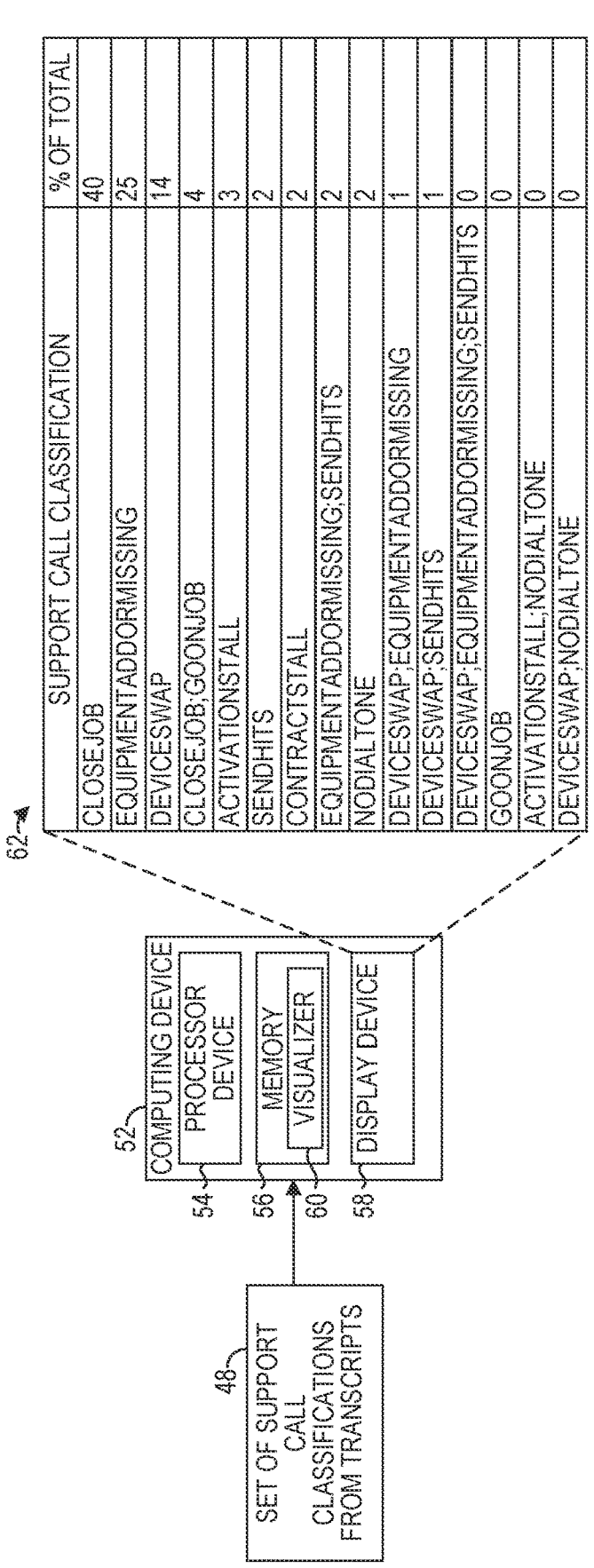

| SUPPORT CALL CLASSIFICATION | % OF TOTAL |
|---|---|
| CLOSEJOB | 40 |
| EQUIPMENTADDORMISSING | 25 |
| DEVICESWAP | 14 |
| CLOSEJOB;GOONJOB | 4 |
| ACTIVATIONSTALL | 3 |
| SENDHITS | 2 |
| CONTRACTSTALL | 2 |
| EQUIPMENTADDORMISSING;SENDHITS | 2 |
| NODIALTONE | 2 |
| DEVICESWAP;EQUIPMENTADDORMISSING | 1 |
| DEVICESWAP;SENDHITS | 1 |
| DEVICESWAP;EQUIPMENTADDORMISSING;SENDHITS | 0 |
| GOONJOB | 0 |
| ACTIVATIONSTALL;NODIALTONE | 0 |
| DEVICESWAP;NODIALTONE | 0 |

FIG. 4

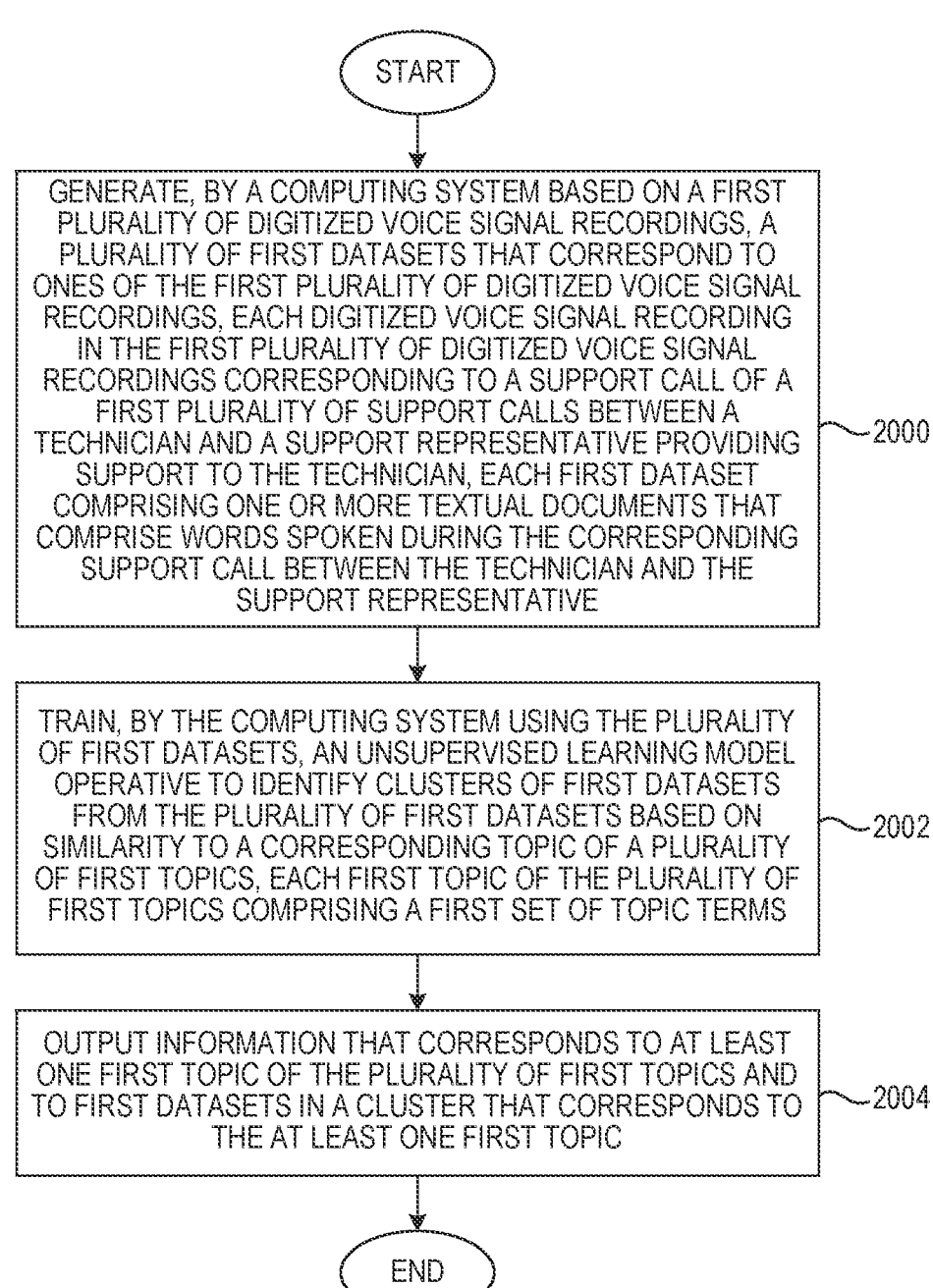

START

GENERATE, BY A COMPUTING SYSTEM BASED ON A FIRST PLURALITY OF DIGITIZED VOICE SIGNAL RECORDINGS, A PLURALITY OF FIRST DATASETS THAT CORRESPOND TO ONES OF THE FIRST PLURALITY OF DIGITIZED VOICE SIGNAL RECORDINGS, EACH DIGITIZED VOICE SIGNAL RECORDING IN THE FIRST PLURALITY OF DIGITIZED VOICE SIGNAL RECORDINGS CORRESPONDING TO A SUPPORT CALL OF A FIRST PLURALITY OF SUPPORT CALLS BETWEEN A TECHNICIAN AND A SUPPORT REPRESENTATIVE PROVIDING SUPPORT TO THE TECHNICIAN, EACH FIRST DATASET COMPRISING ONE OR MORE TEXTUAL DOCUMENTS THAT COMPRISE WORDS SPOKEN DURING THE CORRESPONDING SUPPORT CALL BETWEEN THE TECHNICIAN AND THE SUPPORT REPRESENTATIVE ~2000

TRAIN, BY THE COMPUTING SYSTEM USING THE PLURALITY OF FIRST DATASETS, AN UNSUPERVISED LEARNING MODEL OPERATIVE TO IDENTIFY CLUSTERS OF FIRST DATASETS FROM THE PLURALITY OF FIRST DATASETS BASED ON SIMILARITY TO A CORRESPONDING TOPIC OF A PLURALITY OF FIRST TOPICS, EACH FIRST TOPIC OF THE PLURALITY OF FIRST TOPICS COMPRISING A FIRST SET OF TOPIC TERMS ~2002

OUTPUT INFORMATION THAT CORRESPONDS TO AT LEAST ONE FIRST TOPIC OF THE PLURALITY OF FIRST TOPICS AND TO FIRST DATASETS IN A CLUSTER THAT CORRESPONDS TO THE AT LEAST ONE FIRST TOPIC ~2004

END

COMMUNICATIONS INTERFACE
130

STORAGE DEVICE
124

COMPUTER PROGRAM PRODUCT
126

116

INPUT DEVICE INTERFACE
128

PROCESSOR DEVICE
104

MEMORY
106

RAM
120

OPERATING SYSTEM — 108

DOWNSAMPLER — 110

TRANSCRIBER — 112

LABELER — 114

TRAINER — 134

TEXT NORMALIZER — 136

CONTROLLER

ROM
118

BIOS
122

AUTOMATED SUPPORT CENTER CALL CLASSIFICATION

BACKGROUND

Service provider technicians and the support representatives who provide support to the technicians are highly trained and relatively costly resources. When a technician handling a job in the field needs to call a support representative about a particular topic, this may be indicative of a problem. Where possible, eliminating such problems would reduce the need for relatively costly and time-consuming communication between technicians and support representatives. Additionally, it would be beneficial to understand trends of the topics of such calls over time to determine if particular topics are decreasing, increasing, or new topics are arising.

SUMMARY

The examples disclosed herein implement automated support center call classification.

In one implementation a method is provided. The method includes obtaining, by a computing system, a plurality of training inputs, each training input comprising information associated with a digitized voice signal recording of a first plurality of digitized voice signal recordings, each digitized voice signal recording comprising speech signals of a corresponding support call between a technician and a support representative providing support to the technician. The method further includes training, by the computing system, a machine-learned support call classification model using the plurality of training inputs to generate classification outputs indicative of a particular support call classification of a plurality of support call classifications for each respective training input based on a loss function that evaluates a difference between the particular support call classification and a ground-truth support call classification associated with each respective training input.

In another implementation a computing system is provided. The computing system includes one or more computing devices operable to obtain a plurality of training inputs, each training input comprising information associated with a digitized voice signal recording of a first plurality of digitized voice signal recordings, each digitized voice signal recording comprising speech signals of a corresponding support call between a technician and a support representative providing support to the technician. The one or more computing devices are further operable to train a machine-learned support call classification model using the plurality of training inputs to generate classification outputs indicative of a particular support call classification of a plurality of support call classifications for each respective training input based on a loss function that evaluates a difference between the particular support call classification and a ground-truth support call classification associated with each respective training input.

In another implementation a non-transitory computer-readable storage medium is provided. The non-transitory computer-readable storage medium includes executable instructions operable to cause one or more computing devices to obtain a plurality of training inputs, each training input comprising information associated with a digitized voice signal recording of a first plurality of digitized voice signal recordings, each digitized voice signal recording comprising speech signals of a corresponding support call between a technician and a support representative providing support to the technician. The instructions are further operable to cause one or more computing devices to train a machine-learned support call classification model using the plurality of training inputs to generate classification outputs indicative of a particular support call classification of a plurality of support call classifications for each respective training input based on a loss function that evaluates a difference between the particular support call classification and a ground-truth support call classification associated with each respective training input.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 1 is a block diagram of an environment in which automated support center call classification can be practiced according to some implementations;

FIG. 4 is a block diagram of an environment suitable for analyzing the set of support call classifications derived from the unclassified inputs according to one implementation;

FIG. 7 is a flowchart of a method for automated support center call topic identification according to one implementation;

DETAILED DESCRIPTION

Figure 2:
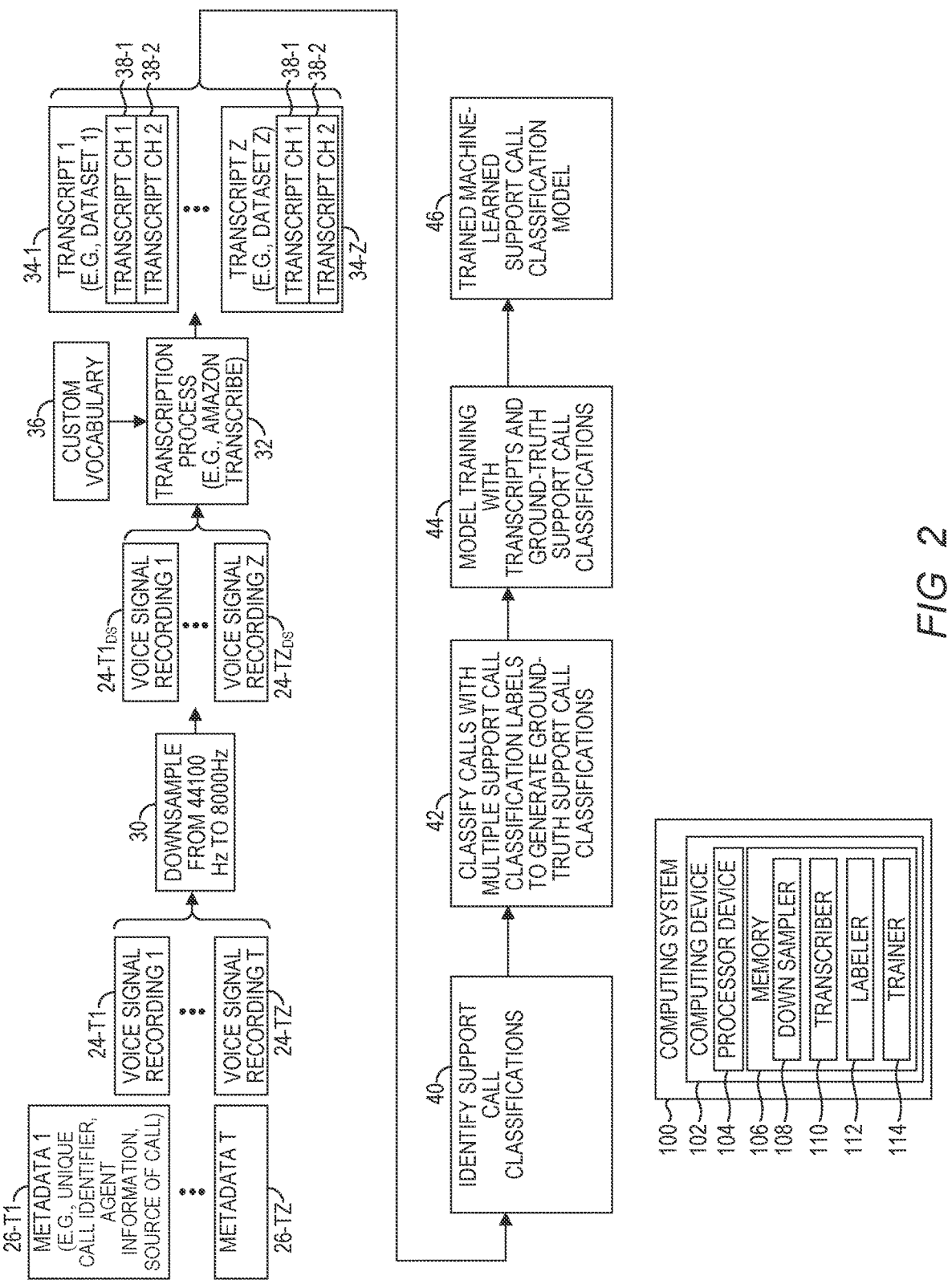
FIG. 2 is a block diagram illustrating a mechanism for automated support center call classification according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Telecommunication service providers typically install equipment at a customer's premises. The initial installation of such equipment, subsequent replacement/upgrading, and/ or problem diagnosis often requires a technician to be physically present at the customer's premises. Dispatching a technician to a customer's premises is relatively expensive.

Typically, an electronic work order is generated that identifies the job to be done during the technician's visit. The work order may be stored and maintained by a central server application in the service provider's network. While at the customer's premises, the technician often utilizes various equipment and software to perform their duties. A self-service software application may lead the technician through a plurality of steps, depending on the particular job. The self-service application may also be used to communicate with the central server application to set the state of the work order during or after the visit.

Often the technician can perform the job successfully on their own. At times, however, the technician may need to interact with a service provider support representative in an effort to perform the job. There may be many reasons that the technician may need to interact with a support representative, such as, by way of non-limiting example, the technician has performed the job, but needs assistance from the support representative to close the job via the work order system due to difficulties with closing the work order in the self-service application, the job may not be able to be performed due to external circumstances such as the customer is not home, there is no access to the job site, or a work cancellation/reschedule has occurred, each of which may require the job to be closed by the support representative so that the technician can pick up the next available job. In some situations, the technician may need help adding equipment, and the new equipment to be added requires changes in a central system maintained by the service provider that the self-service application cannot do. In some situations, the technician may need to swap one piece of equipment for another of the same device type and requires help from the support representative to do so.

These are only examples of the reasons why a technician may need to initiate a support call with a support representative. However, each such interaction is relatively expensive because the interaction involves at least two relatively highly skilled individuals who are attempting to resolve a problem. From a cost perspective, it would be preferable if the technician were able to perform the job without the interaction with the support representative. Thus, it would be desirable to be able to identify the primary reasons for such calls so that efforts could be made to reduce the quantity of such calls.

A large service provider may have millions of customers, and may dispatch thousands of technicians to perform jobs on a daily basis. Consequently, there may be thousands of calls between a technician and a support representative each day that amount to, for example, between 3,000,000-4,000, 000 minutes (i.e., approximately 7 years of calls) each month. Each such call may be recorded by the service provider. However, analyzing thousands of such calls on a daily or other periodic basis by humans to determine common issues raised on such calls would be prohibitively costly, impracticable, or impossible. Moreover, without analyzing the calls over a period of time, such as a month, or months, it would be impossible to know the relative quantity of the various reasons for calls between a technician and a support representative, which would be important to know in order to focus improvements on the self-service application, the workflow process, or elsewhere, in an effort to reduce such calls. For example, if there are 30 potential different reasons for such calls, knowing the most frequent reasons would allow efforts to be focused on changes that reduce or eliminate the need for such calls.

In some implementations, the examples disclosed herein implement automated support center call classification. In some implementations, support calls between a technician and support representative are recorded. A set of such calls, such as thousands of such calls, may be automatically transcribed to generate a set of textual transcripts. The set of textual transcripts may be analyzed by individuals. The individuals classify each call with one or more support call classifications from a set of potential support call classifications. The set of textual transcripts form a ground-truth support call classification.

A machine-learned support call classification model can then be trained using the first set of textual transcripts to output, for each textual document, one or more support call classifications. A second set of calls can then be processed by the trained machine-learned support call classification model to identify the support call classifications associated with the second set of calls. Information can be derived and presented that can be used to identify primary reasons for such support calls, and actions can be taken to reduce such support calls, reducing costs associated with jobs. After such actions have been implemented, a third set of calls that occur subsequent to such actions can be processed by the trained machine-learned support call classification model to determine whether the action(s) successfully reduced such support calls.

While classifying calls based on known categories is advantageous for the reasons discussed above, it would also be advantageous to determine what topics are being discussed in the support calls, which may provide even additional insight into actions that can be taken to reduce support calls, to validate the effectiveness of such actions, to determine if particular topics are decreasing, increasing, or if new topics are arising.

In other implementations, the examples disclosed herein implement automated support center call topic classification. As discussed above, support calls between a technician and support representative are recorded. A set of such calls, such as thousands of such calls, may be automatically transcribed to generate a set of textual transcripts. The set of textual transcripts may be used to train an unsupervised learning model operative to identify clusters of the textual transcripts from the plurality of textual transcripts based on similarity to a corresponding topic of a first plurality of topics, each topic comprising a set of topic terms. Each topic term may comprise one or multiple words. Information can be output that identifies each set of topic terms that corresponds to each topic and, for each topic, the textual transcripts in the cluster that corresponds to the topic.

In this manner, transcripts relating to particular topics can be easily identified and analyzed in an effort to reduce calls between field technicians and support representatives. In addition, this process can be repeated each successive period of time, such as each month, for trend analysis to identify differences in the quantity of transcripts associated with particular topics over time. Moreover, the identification of new topics that had not been identified in previous months may indicate the emergence of new problems. The transcripts associated with the new topics may be analyzed to determine the cause of the new problems.

FIG. 1 is a block diagram of an environment 10 in which automated support center call classification can be practiced according to some implementations. The environment 10 includes a technician support center 12 in which a central computing system 14 may be located, and where one or more support representatives 16-1-16-M (generally, support representatives 16) are located. It is noted that in practice the support representatives 16 may be located together or apart from one another, and in fact may work remotely from individual locations, such as homes. Moreover, while for purposes of illustration a single central computing system 14 is illustrated, in practice, the functions of the central computing system 14 may be distributed across any number of computing devices, and all or a portion of such functionality may be implemented in a cloud computing environment.

The environment 10 includes a plurality of customer premises 18-1-18-Y (generally, customer premises 18). A customer premises 18 may be, for example, a home, a business location, or the like. The service provider employees a plurality of technicians 20-1-20-R (generally, technicians 20) who are trained to perform various jobs at a customer premises.

A work order 22 is generated when a technician 20 is required to perform a job at a customer premises 18. The work order 22 identifies the nature of the job. Each job may involve one or more tasks. A job may involve, by way of non-limiting example, an initial connection and installation of equipment to provide new service to a customer premises 18, an equipment upgrade due to a change in service subscription, an equipment swap due to faulty equipment, or general fault diagnosis and resolution.

A technician 20 may utilize a computing device 23, such as a laptop computer, a computing tablet, a smartphone, or the like, when performing a job at a customer premises 18. The computing device 23 may execute a service application 26 that interacts with the central computing system 14. The service application 26 may, by way of non-limiting example, identify the particular job to be performed at a customer premises 18, identify the particular location of the customer premises 18, provide a checklist of tasks to be performed, and allow the technician 20 to modify the status of the job such as to indicate the job has been completed, or was not completed for a particular reason, or the like.

Preferably the technician 20 is able to perform a job without a need to contact a support representative 16. The support representatives 16 may be relatively highly trained individuals who specialize in providing support to the technicians 20 and thus are relatively costly resources, and extended interactions between technicians 20 and support representatives 16 raise costs and may delay resolutions, resulting in customer dissatisfaction. When a technician 20 must contact a support representative 16, the audio call may be recorded and stored in a digital format, such as a wav or wma format or the like, as a digitized voice signal recording 24-1-24-T (generally, voice signal recordings 24). The voice signal recordings 24 may comprise two-channel recordings, one channel corresponding to the particular technician 20 and one channel corresponding to the particular support representative 16. Each voice signal recording 24 may also include corresponding metadata 26-1-26-T that contains information regarding the audio call, such as a unique call identifier, identities of the particular technician 20 and the support representative 16 who participated in the call, the date and time of the call, and the like. Over the course of a day, thousands of such calls may take place and thousands of voice signal recordings 24 may be generated.

It would be useful to glean information from the voice signal recordings 24 that may reduce the quantity of calls between the technicians 20 and the support representatives 16. However, the quantity of the voice signal recordings 24 and the unique individual nature of each such call make this impractical or impossible.

The examples disclosed herein implement automated support center call classification that facilitates the determination of the nature of the calls, potential actions that can be taken to reduce the calls, and subsequent analysis of whether such actions in fact did reduce the calls.

FIG. 2 is a block diagram illustrating a mechanism for automated support center call classification according to one implementation. Many of the steps discussed herein may be performed by a computing system 100 that includes one or more computing devices 102, each of which includes a processor device 104 and a memory 106. A set of voice signal recordings 24-T1-24-TZ (generally, voice signal recordings 24-T) of calls between technicians 20 and support representatives 16 and corresponding metadata 26-T1-26-TZ are selected. Although not illustrated for spatial reasons, as discussed above, each of the voice signal recordings 24-T may comprise two channels, one corresponding to the technician 20 and one to the support representative 16.

The set of voice signal recordings 24-T may comprise thousands of voice signal recordings 24-T. The voice signal recordings 24-T will be transcribed by a transcription process 32. Depending on the particular transcription process 32 used, it may be desirable to pre-process the voice signal recordings 24-T prior to submission to the transcription process 32. In this example, the voice signal recordings 24-T are initially recorded in a 44, 100 Hz sampling rate and in a wma format. Because the transcription process 32 provides better results when voice signal recordings 24-T are at an 8000 Hz sampling rate and in a wav format, a down sampler 108, such as, by way of non-limiting example, librosa, available at github.com/librosa/librosa, preprocesses the voice signal recordings 24-T to down sample the voice signal recordings 24-T from 44, 100 Hz to 8000 Hz and converts the voice signal recordings 24-T to the wav format in a down sampling process 30 to generate corresponding voice signal recordings $24\text{-}T1_{DS}\text{-}24\text{-}TZ_{DS}$. A transcriber 110, such as, by way of non-limiting example, Amazon Transcribe, transcribes the voice signal recordings 24-T $1_{DS}\text{-}24\text{-}TZ_{DS}$ in a transcription process 32 to generate a corresponding plurality of datasets of textual documents, such as a plurality of transcripts 34-1-34-Z (generally, transcripts 34), that comprise words spoken during a respective support call between a technician 20 and a support representative 16.

In some examples, a custom vocabulary 36 may be generated for the transcription process 32 to improve transcription accuracy. In some examples, the transcriber 110 may implement redaction to remove any personably identifiable information from the transcripts 34. Each dataset corresponds to a single support call, and may comprise a single textual document, or, in this example, each dataset may comprise multiple textual documents in the form of two channel transcripts 38-1, 38-2, the channel transcript 38-1 comprising a textual document corresponding to words spoken by the technician 20 and the channel transcript 38-2 comprising a textual document corresponding to words spoken by the support representative 16.

At block 40, subject matter experts familiar with the role of the technicians 20 and potential issues that may arise resulting in a need for a technician 20 to contact a support representative 16 identify eight support call classifications that correspond to reasons why the technician 20 initiated the support call with the support representative 16. In this example, the eight support call classifications are illustrated in Table 1, below.

TABLE 1

| Support Call Classification | Definition |
| --- | --- |
| GoOnJob | Provide support starting the job |
| CloseJob | Provide support closing out the job |
| EquipmentAddOrMissing | Provide support adding equipment or with missing equipment |
| DeviceSwap | Provide support swapping out a device |
| ActivationStall | Provide support when activation is stalled in Tech Mobile |
| SendHits | Send digital hits to activate or troubleshoot devices |
| NoDialTone | Provide support when there is no dial tone during provisioning |
| ContractStall | Provide support when there is a contract stalled error or third-party verification issue |

The following are more detailed explanations of the support call classifications according to one implementation.

CloseJob: the technician 20 has performed the required work, but needs assistance from a support representative 16 to close the job in the central computing system instead of closing it in the service application 26; or the job is not done due to external circumstances (customer not home, no access to the job site, work cancellation/reschedule, etc.), which requires the job to be closed by the support representative 16 so that the technician 20 can pick up the next available job.

EquipmentAddOrMissing: the technician 20 needs help adding equipment(s), and the new equipment to be added requires changes in a central computing system 14 that cannot be performed by the service application 26, or equipment that is required is missing.

DeviceSwap: the technician 20 needs to swap one piece of equipment for another of the same device type.

ActivationStall: the technician 20 experiences an "Activation Stalled" error in the service application 26, usually due to an upstream process that is not completed prior to preparing the device for activation.

SendHits: the technician 20 needs assistance from a support representative 16 in sending hits to the device as part of the activation/troubleshooting process.

ContractStall: the technician 20 experienced a "contract stalled" error in the service application 26, usually due to an upstream process related to a contract or agreement that was not completed.

NoDialTone: the technician 20 is installing equipment for voice and the equipment is not working properly (e.g., no dial tone for phone services).

GoOnJob: the technician 20 has issues at the job start and cannot proceed to perform scheduled work.

During a call between a technician 20 and a support representative 16, multiple topics may be discussed, and thus, a single call may have more than one support call classification. At block 42, the voice signal recordings 24-T may be listened to by a group of individuals (e.g., referred to sometimes herein as "annotators") and the corresponding transcripts 34 labelled with the appropriate support call classification label(s). In this example, approximately 1000 voice signal recordings 24-T were listened to and corresponding transcripts 34 labelled accordingly. In some examples, the annotators may use a labeler 112, such as, by way of non-limiting example, Label Studio, available at labelstud.io to label the voice signal recordings 24-T.

In this example, each annotator was required to label each transcript 34 with at least one support call classification label and optionally up to three support call classification labels. Each transcript 34 was labeled by at least two annotators, and, if there was no consensus, by a third annotator. The labelled transcripts 34 constitute ground-truth support call classifications.

At block 44, a trainer 114 trains a machine-learned support call classification model 46 using training inputs that comprise information associated with a plurality of digitized voice signal recordings, each digitized voice signal recording comprising speech signals of a corresponding support call between a technician 20 and a support representative 16 providing support to the technician 20. In this example, the information comprises the labelled transcripts 34. However, the examples are not limited to training using the transcripts 34, and in other embodiments, the training inputs may be the actual voice signal recordings 24-T labelled with the appropriate support call classifications. The machine-learned support call classification model 46 is trained using the plurality of training inputs (e.g., the transcripts 34) to predict classification outputs indicative of a particular support call classification of the plurality of support call classifications for each respective training input based on a loss function that evaluates a difference between the particular support call classification and the ground-truth support call classification as established by the annotators associated with each respective training input. The loss function is any suitable function that compares the predicted classification outputs with the ground-truth support call classifications.

Figure 3:
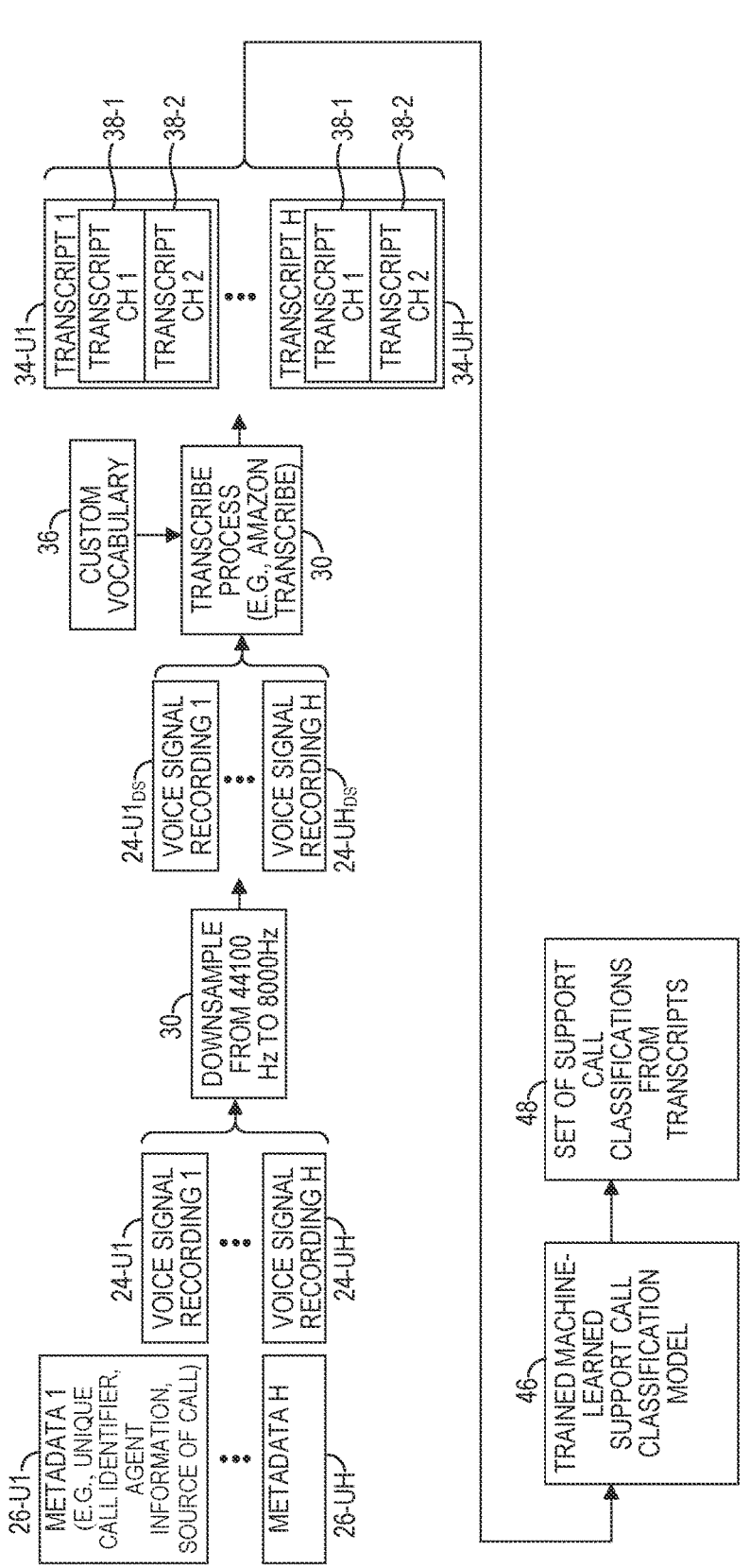
FIG. 3 is a block diagram illustrating a plurality of unclassified digitized voice signal recordings, each of which comprises speech signals of a corresponding support call between a technician and a support representative providing support to the technician, being classified by a machine-learned support call classification model to generate a set of support call classifications.

FIG. 3 is a block diagram illustrating a plurality of unclassified digitized voice signal recordings 24-U1-24-UH (generally, voice signal recordings 24-U), each of which comprises speech signals of a corresponding support call between a technician 20 and a support representative 16 providing support to the technician 20, being classified by the trained machine-learned support call classification model 46. The voice signal recordings 24-U may comprise, for example, voice signal recordings of each support call over a period of time, such as a month. The voice signal recordings 24-U are processed in a similar manner as discussed above with regard to FIG. 2 to generate a plurality of corresponding unclassified inputs in the form of transcripts 34-U1-34-UH. The transcripts 34-U1-34-UH are then processed by the trained machine-learned support call classification model 46 to generate a set 48 of support call classifications derived from the unclassified inputs.

FIG. 4 is a block diagram of an environment 50 suitable for analyzing the set 48 of support call classifications derived from the unclassified inputs according to one implementation. The environment 50 includes a computing device 52 that includes a processor device 54 and a memory 56. The computing device 52 includes or is coupled to a display device 58. A visualizer 60 accesses the set 48 of support call classifications derived from the unclassified inputs. The visualizer 60 processes the set 48 of support call classifications to determine a most occurring support call classification of the set of support call classifications. The visualizer 60 presents on the display device 58 information 62 identifying the most occurring support call classification.

In this example, the information 62 identifies, for each support call classification and each potential combination of support call classifications, the percentage of occurrence of each support call classification and potential combination of support call classifications in the total number of transcripts 34. For example, the information 62 indicates that 40 percent of the calls were classified as the CloseJob support call classification, and 25 percent of the calls were classified as the EquipmentAddOrMissing support call classification.

Thus, at least for this period of time, a majority of the support calls between a technician 20 and a support representative 16 involved either an issue associated with the CloseJob support call classification or the EquipmentAddOrMissing support call classification. The service provider may then, for example, analyze individual transcripts 34-U, or have discussions with the technicians 20 and/or support representatives 16, to determine the core reasons why it is necessary for the technicians 20 to contact the support representatives 16 for these issues. The service provider may then take one or more actions, such as modification of the service application 26, or additional training of the technicians 20, or implementation of additional workflow steps prior to the technician arriving at a customer premise to reduce the likelihood of a need for the technicians 20 to contact a support representative 16 for these reasons.

Subsequently, after such action(s) have been implemented, another set of unclassified digitized voice signal recordings 24, each of which comprises speech signals of a corresponding support call between a technician 20 and a support representative 16 providing support to the technician 20, can be processed in a similar manner as discussed above with regard to FIG. 2 to generate a plurality of corresponding unclassified inputs in the form of transcripts 34. The transcripts 34 can then be processed by the machine-learned support call classification model 46 to generate a new set of support call classifications derived from the unclassified inputs. The visualizer 60 may access the new set of support call classifications derived from the unclassified inputs and provide information identifying the most occurring support call classifications to determine whether the actions successfully reduced the need for the technicians 20 to contact a support representative 16 for reasons classified as the CloseJob support call classification or the EquipmentAddOrMissing support call classification.

Figure 5:
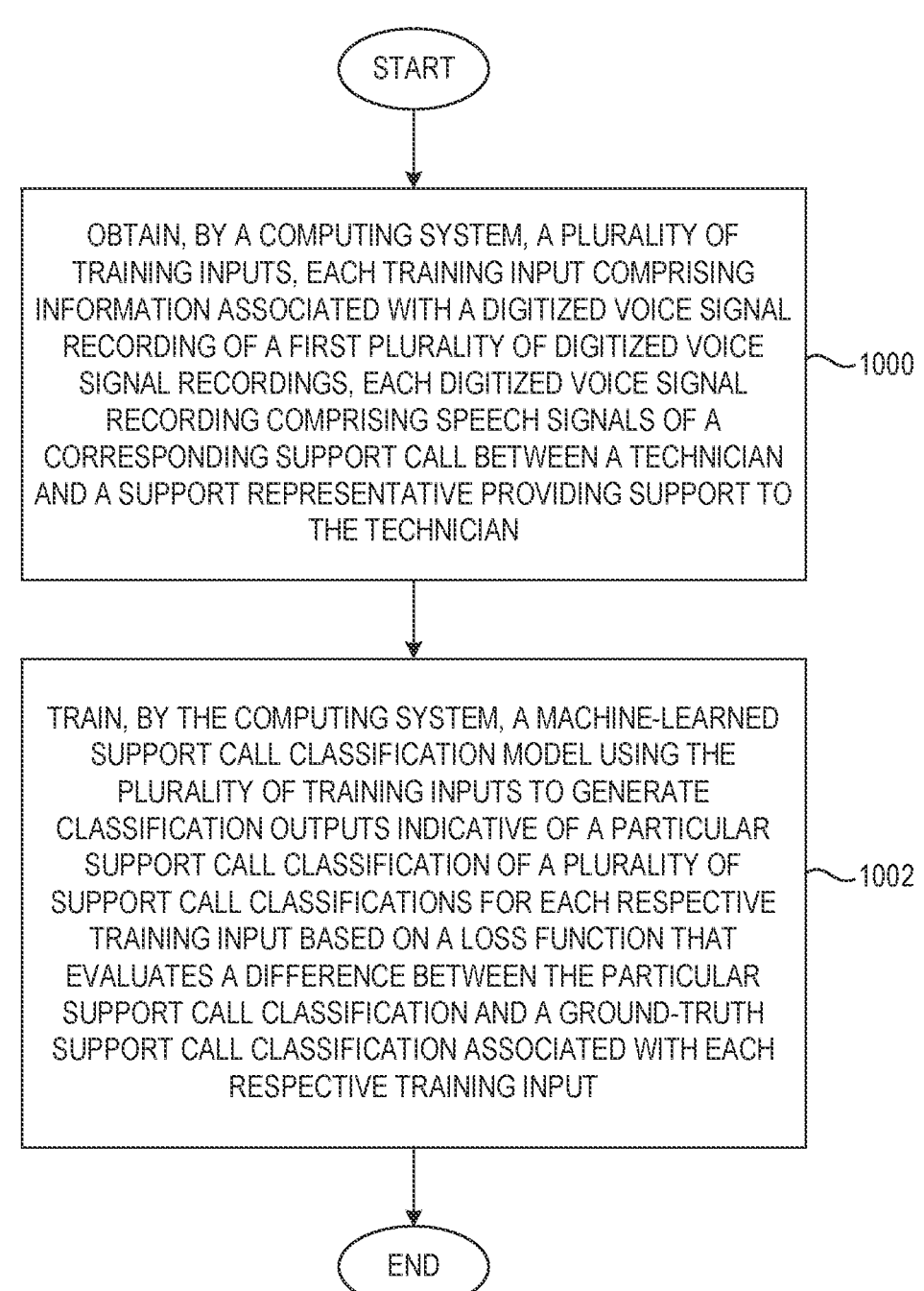
FIG. 5 is a flowchart of a method for automated support center call classification according to one implementation.

FIG. 5 is a flowchart of a method for automated support center call classification according to one implementation. FIG. 5 will be discussed in conjunction with FIGS. 1 and 2. The computing system 100 accesses a plurality of training inputs, in this example the plurality of transcripts 34-1-34-Z, each training input comprising information associated with a digitized voice signal recording 24-T of a first plurality of digitized voice signal recordings 24-T1-24-TZ, each digitized voice signal recording 24-T comprising speech signals of a corresponding support call between a technician 20 and a support representative 16 providing support to the technician 20 (FIG. 5, block 1000). The computing system 100 trains the machine-learned support call classification model 46 using the plurality of training inputs to generate classification outputs indicative of a particular support call classification of a plurality of support call classifications for each respective training input based on a loss function that evaluates a difference between the particular support call classification and a ground-truth support call classification associated with each respective training input (FIG. 5, block 1002).

Figure 6A:
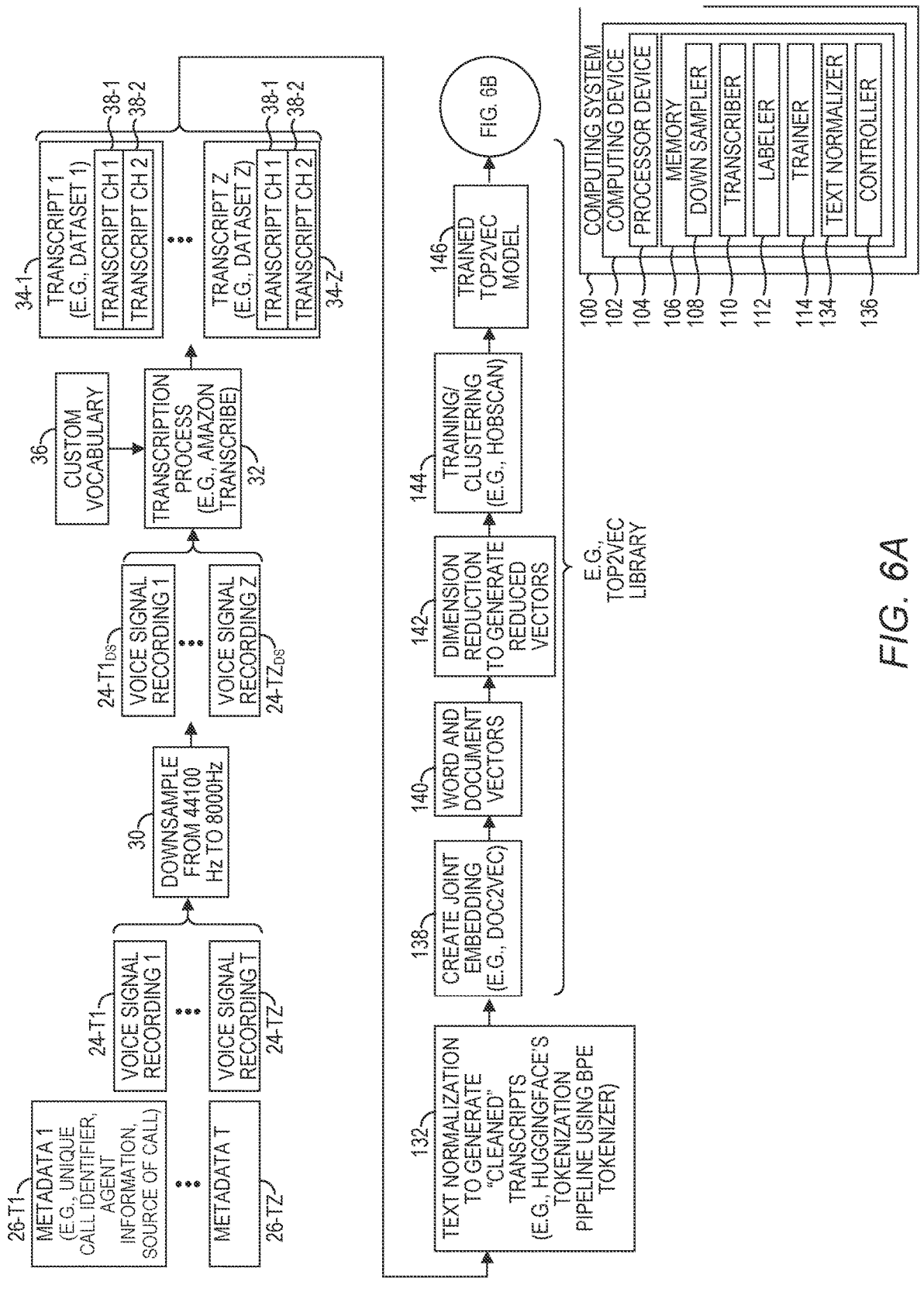
FIGS. 6A-6B illustrate a block diagram depicting steps suitable for automated support center call topic identification according to one implementation.
Figure 6B:
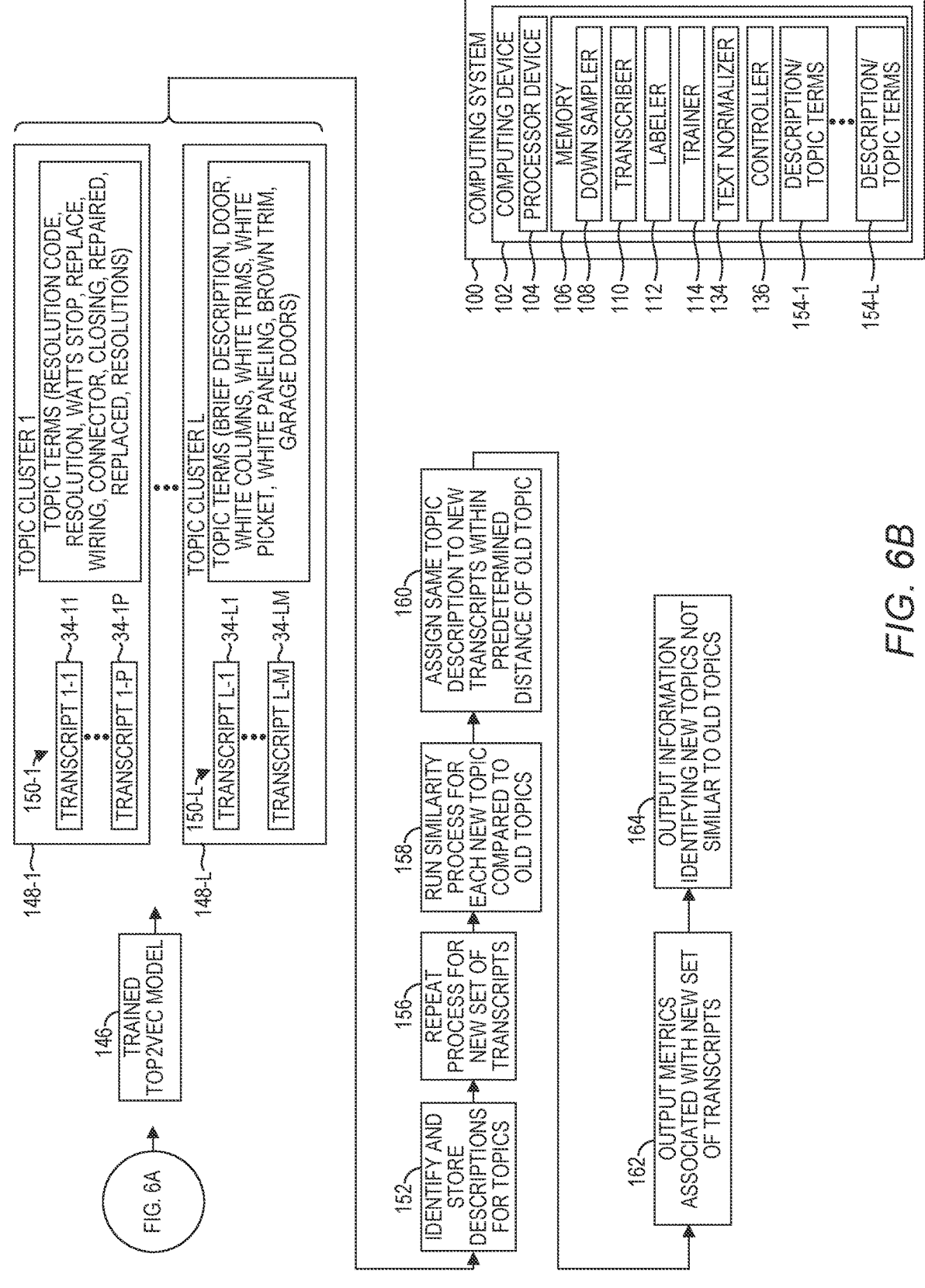

FIGS. 6A-6B illustrate a block diagram depicting steps suitable for automated support center call topic identification according to one implementation. Many of the steps discussed herein may be performed by the computing system 100 that includes the one or more computing devices 102, each of which includes the processor device 104 and the memory 106. The set of voice signal recordings 24-T1-24-TZ (generally, voice signal recordings 24-T) of calls between technicians 20 and support representatives 16 and corresponding metadata 26-T1-26-TZ are selected. Although not illustrated for spatial reasons, as discussed above, each of the voice signal recordings 24-T may comprise two channels, one corresponding to the technician 20 and one to the support representative 16.

The voice signal recordings 24-T will be transcribed by the transcription process 32. The down sampler 108 preprocesses the voice signal recordings 24-T to down sample the voice signal recordings 24-T from 44,100 Hz to 8000 Hz and converts the voice signal recordings 24-T to the wav format in the down sampling process 30 to generate corresponding voice signal recordings $24\text{-}T1_{DS}\text{-}24\text{-}TZ_{DS}$. The transcriber 110 transcribes the voice signal recordings $24\text{-}T1_{DS}\text{-}24\text{-}TZ_{DS}$ in the transcription process 32 to generate the corresponding plurality of datasets of textual documents, such as the plurality of transcripts 34-1-34-Z (generally, transcripts 34), that comprise words spoken during a respective support call between a technician 20 and a support representative 16.

The custom vocabulary 36 may be generated for the transcription process 32 to improve transcription accuracy. Each dataset corresponds to a single support call, and may comprise a single textual document, or, in this example, each dataset may comprise multiple textual documents in the form of two channel transcripts 38-1, 38-3, the channel transcript 38-1 comprising a textual document corresponding to words spoken by the technician 20 and the channel transcript 38-2 comprising a textual document corresponding to words spoken by the support representative 16.

In this implementation, at a step 132, a text normalizer 134, such as, by way of non-limiting example, Hugging-Face's tokenization pipeline, available at huggingface.co, using a byte-pair encoder (BPE) tokenizer, may be used to process the transcripts 34 to generate "cleaned" transcripts in preparation for training an unsupervised learning model with the transcripts 34. A controller 136 then implements a joint embedding process 138 to generate word and document vectors 140 from the transcripts 34. The joint embedding process 138 may be implemented, by way of non-limiting example, by Doc2Vec. In some embodiments, the controller 136 may implement a dimension reduction process 142, such as a Uniform Manifold Approximation and Projection (UMAP) dimension reduction process, on the word and document vectors 140 to reduce the high dimensional space of the vectors 140. The controller 136 may then, at step 144, train an unsupervised learning model 146 using the reduced word and document vectors 140 utilizing, for example, a Hierarchical Density-Based Spatial Clustering of Applications with Noise (HDBSCAN) hierarchical density-based clustering algorithm. In this particular implementation, the processes described with regard to steps 138 through 146 may be available at github.com/ddangelov/Top2Vec.

Referring now to FIG. 6B, the trained model 146 identifies clusters of the datasets (e.g., transcripts 34) based on similarity to a corresponding topic 148-1-148-L (generally, topics 148), each topic 148 comprising a set of topic terms. For example, the topic 148-1 is composed of the topic terms "resolution code," "resolution," "watts stop," "replace," "wiring," "connector," "closing," "repaired," "replaced," and "resolutions." A cluster 150-1 of transcripts 34-11-34-1P of the plurality of transcripts 34 correspond to the topic 148-1. As another example, the topic 148-L is composed of the topic terms "brief description," "door," "white columns," "white trims," "white picket," "white paneling," "brown trim," and "garage doors." A cluster 150-L of transcripts 34-L1-34-LM of the plurality of transcripts 34 correspond to the topic 148-L. The number of topics 148 and corresponding clusters 150 output by the trained model 146 may be configurable.

At a step 152, subject matter experts may generate textual descriptions for each of the topics 148 and store the descriptions in association with the corresponding topic terms of the topics 148 in entries 154-1-154-L. Descriptions may be helpful in bringing meaningful context to each cluster 150 of transcripts 34, such as, by way of non-limiting example, "Equipment", "Job Closure," "Service Inquiry," "Job Not Done," "Process Break," "Referral," "Order Readiness", "Serviceability," "Call Redirection," and the like. The descriptions may include any desired textual explanation, and may be organized in any desired manner, such as by category and sub-category, or the like, such that different topics 148 may be in a same category, but have different sub-categories. As an example, the topic 148-1 may be given a description that includes a category of "RESOLUTION CODE" and a subcategory of "JOB CLOSURE". The topic 148-L may be given a description that includes a category of "NOT HOME" and a subcategory of "JOB NOT DONE". The descriptions may be associated with each transcript 34 in the cluster 150 that corresponds to the particular topic 148, such as via metadata, a list, or any other mechanism for associating information with a document or set of documents.

The computing system 100 may output information that identifies the topic descriptions and topic terms for each topic 148, and the quantity of transcripts 34 in each cluster 150. This information can be provided, for example, in bar chart or other graphical form to show the relative occurrences of the particular topics 148 with respect to one another, such that an operator can quickly ascertain which topics 148 are most often discussed in the transcripts 34.

The process described above may have been performed for the transcripts 34 generated during a first period of time, such as those generated during January. At step 156, the process may be repeated for a subsequent period of time, such as the set of transcripts 34 generated during February. Again, a newly trained unsupervised learning model identifies clusters of the datasets (e.g., the set of transcripts 34 generated during February) based on similarity to a corresponding new topic, each new topic comprising a set of topic terms. The term "new topic" in this context refers to the fact that the output of the unsupervised learning model for the set of transcripts 34 generated during February may be independent of the output of the trained model for the set of transcripts 34 generated during January, and the topics output for the set of transcripts 34 generated during February may or may not be identical, or even similar, to those output for the set of transcripts 34 generated during January.

At step 158, the controller 136 may compare each new topic identified in the February transcripts 34 to each of the topics 148 previously identified in the January transcripts 34. The controller 136 may use a similarity function to determine how similar a topic identified in February is to each of the previous topics identified in January. Any suitable similarity function operable to quantify a similarity between to lists, or vectors, of terms, may be utilized. In one example, a cosine similarity function that quantifies a similarity between two word vectors is used. The cosine similarity function may output a similarity value that ranges between −1 to 1, with −1 being least similar and 1 being most similar. The controller 136 may then determine, via the similarity function, which topic 148 has a highest similarity value to the new topic. At step 160, the controller 136 may compare the highest similarity value to a predetermined threshold or range, and, if the highest similarity value meets the predetermined threshold, assign the description that corresponds to the topic 148 to the transcripts 34 generated during February. This eliminates a need for a human, each time a newly trained unsupervised learning model is generated based on new transcripts 34, to reevaluate what descriptions should be attributed to which clusters of transcripts 34.

At step 162, the controller 136 may output metrics associated with the new transcripts 34 generated during February, such as the topic descriptions and topic terms for each topic, and the quantity of transcripts 34 in each cluster. Again, this information can be provided, for example, in bar chart or other graphical form to show the relative occurrences of the particular topics with respect to one another, such that an operator can quickly ascertain which topics are most often discussed in the transcripts 34.

At step 164, the controller 136 may output information that identifies new topics that were identified in the transcripts 34 generated during February that are not sufficiently similar to any of the previous topics 148 generated during January. The transcripts 34 that correspond to a topic that is not similar to any previous topic 148 can then be analyzed to determine, by way of non-limiting example, whether such transcripts 34 indicate a new emerging problem, or a transient problem, such as a service outage.

FIG. 7 is a flowchart of a method for automated support center call topic identification according to one implementation. FIG. 7 will be discussed in conjunction with FIGS. 6A-6B. The computing system 100 generates, based on the plurality of digitized voice signal recordings 24-T1-24-TZ, a plurality of datasets, such as the transcripts 34, that correspond to ones of the plurality of digitized voice signal recordings 24, each digitized voice signal recording in the plurality of digitized voice signal recordings corresponding to a support call between a technician and a support representative providing support to the technician, each dataset comprising one or more textual documents that comprise words spoken during the corresponding support call between the technician and the support representative (FIG. 7, block 2000).

The computing system 100 trains, using the plurality of datasets, the unsupervised learning model 146 operative to identify clusters of the datasets from the plurality of datasets based on similarity to a corresponding topic 148 of the plurality of topics 148-1-148-L, each topic 148 comprising a set of topic terms (FIG. 7, block 2002). The computing system 100 outputs information that corresponds to at least one topic 148 and the datasets in the cluster that corresponds to the at least one topic 148 (FIG. 7, block 2004).

Figure 8:
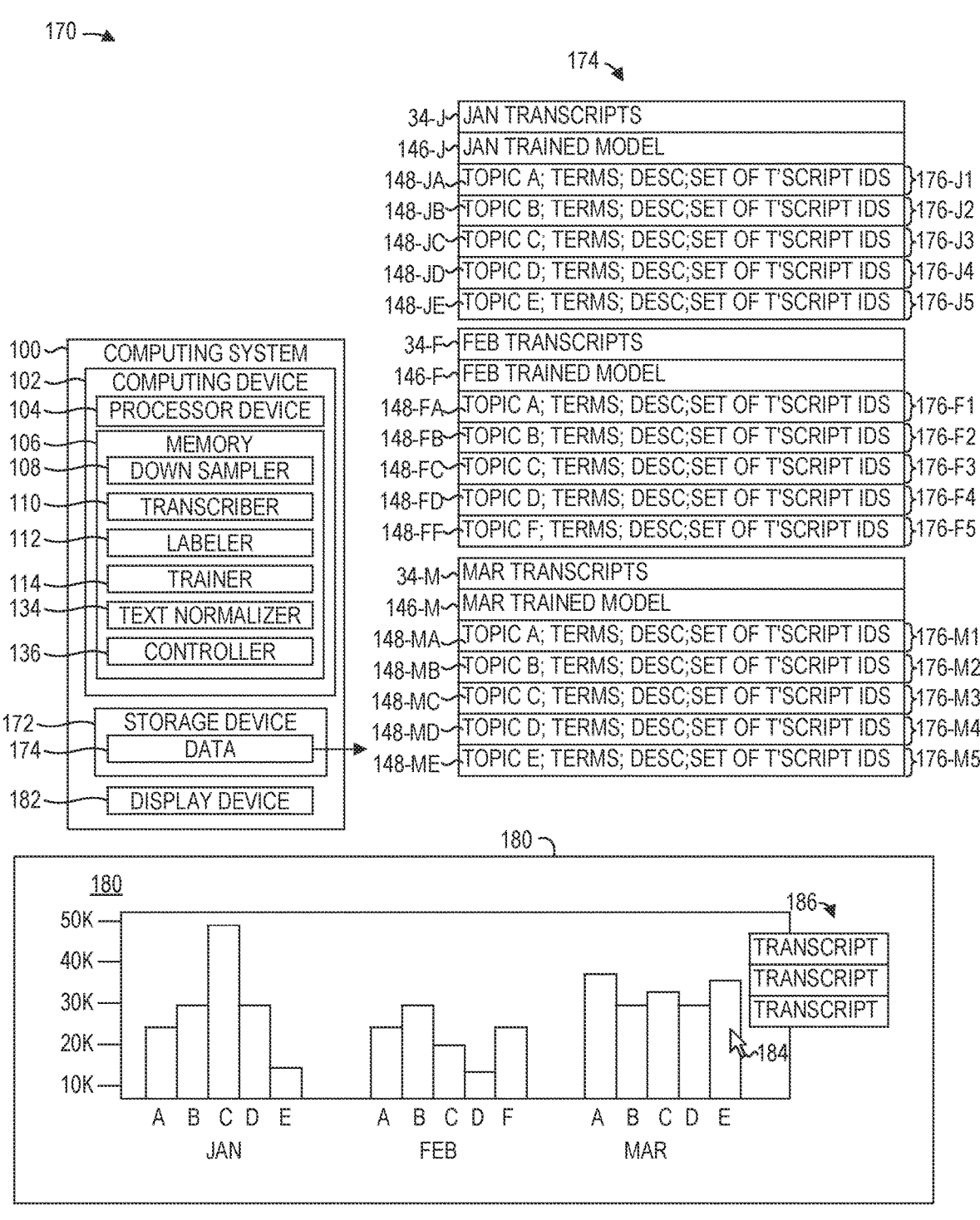
FIG. 8 is a block diagram of an environment in which automated support center call topic identification can be practiced according to some implementations.

FIG. 8 is a block diagram of an environment 170 in which automated support center call topic identification can be practiced according to some implementations. In this example, a storage device 172 stores data 174 associated with voice recordings generated over three months. Initially, the computing system 100 processes a plurality of January transcripts 34-J generated during the month of January in accordance with the process described above in FIGS. 6A-6B to generate a January trained model 146-J, that outputs six topics 148-JA-148-JE. For each topic 148, a corresponding data structure, such as records 176-J1-176-J6, is generated that identifies the topic terms (e.g., "TERMS") that the January trained model 146-J determines compose the corresponding topic 148, a description (e.g., "DESC"), and information that identifies the cluster of transcripts 34 (e.g., "SET OF T'SCRIPT IDS"), that correspond to the topic 148. Assume, for purposes of illustration, that the descriptions in each of the records 176-J1-176-J6 were generated by subject matter experts after reviewing the topic terms and transcripts associated with each topic 148-JA-148-JE.

The process described above in FIGS. 6A-6B is repeated for a plurality of transcripts 34-F generated in February to generate a February trained model 146-F. The February trained model 146-F outputs five topics, 148-FA-148-FD and 148-FF, and for each topic the corresponding topic terms and set of transcripts 34 that correspond to the topic, to generate records 176-F1-176-F5. Initially, the records 176-F1-176-F5 do not contain a description. The controller 136 then uses a similarity function as discussed above to separately compare the topic terms of the topic 148-FA with each of the topics 148-JA-148-JE. As an example, the corresponding similarity values may be 0.95, 0.45, –0.33, –0.13 and 0.20, respectively. Based on these similarity values, the controller 136 determines that the topic 148-JA is most similar to the topic 148-FA. The controller 136 also determines that the similarity value 0.95 exceeds a predetermined similarity threshold, such as 0.90. The controller 136 automatically modifies the record 176-F1 to include the description from the record 176-J1, even though the topic terms of the topic 148-FA are not identical to the topic terms of the topic 148-JA.

This process is repeated for the topics 148-FB-148-FD. The controller 136 determines that the topic 148-FB is most similar to the topic 148-JB and that the similarity value exceeds the predetermined similarity threshold. The controller 136 modifies the record 176-F2 to include the description from the record 176-J2. The controller 136 determines that the topic 148-FC is most similar to the topic 148-JC and that the similarity value exceeds the predetermined similarity threshold. The controller 136 modifies the record 176-F3 to include the description from the record 176-J3. The controller 136 determines that the topic 148-FD is most similar to the topic 148-JD and that the similarity value exceeds the predetermined similarity threshold. The controller 136 modifies the record 176-F4 to include the description from the record 176-J4.

The controller 136 determines that the topic 148-FF is not sufficiently similar to any of the topics 148-JA-148-JE. The controller 136 may then output information identifying the topic 148-FF, the topic terms, and the set of transcript IDS that correspond to the topic 148-FF. A subject matter expert may then analyze the corresponding set of transcripts 34 and generate a description for the topic 148-FF and modify the record 176-F5 with the description.

The process described above in FIGS. 6A-6B is repeated for a plurality of transcripts 34-M generated in March to generate a March trained model 146-M. The March trained model 146-M outputs five topics, 148-MA-148-ME, and for each topic the corresponding topic terms and set of transcripts 34 that correspond to the topic, to generate records 176-M1-176-M5. Initially, the records 176-M1-176-M5 do not contain a description. The controller 136 then uses a similarity function, such as, by non-limiting example, a cosine similarity function to separately compare the topic terms of the topic 148-FA with each of the topics 148-JA-148-JE and topics 148-FA-148-FF. In this example, the controller 136 determines that each of the topics 148-MA-148-ME has sufficient similarity to a previously generated topic 148 and modifies each of the records 176-M1-176-M5 to include the description associated with the most similar previously generated topic 148.

It is noted that, for purposes of illustration, a relatively small number of topics 148 are illustrated, however, in practice, there may be tens or hundreds of different topics 148 identified each month by a trained unsupervised learning model 146.

The controller 136 may generate any desired visualizations from the data 174. A visualization may, for example, identify for each topic 148 the topic terms, the description and the percentage of transcripts 34 that correspond to the topic 148 over a period of time, such as a month. A visualization may identify, for each topic 148, the percentage of transcripts 34 that correspond to the topic 148 on a daily basis over a period of time, such as a week or month. The transcripts 34 may include regional information, such as by state, and a visualization may illustrate desired information on a region by region basis.

In one example, the controller 136 accesses the data 174 and presents a visualization 180 on a display device 182. In this example, the visualization 180 identifies the quantity of transcripts 34 associated with each topic 148 over the three months of January, February, and March. An operator or other user may utilize a cursor 184 to select a particular topic 148 in a particular month and be presented with information, such as the topic terms that correspond to the topic 148, the description that corresponds to the topic 148, and a scrollable list 186 of the transcripts 34 that correspond to the topic 148. The operator may select a particular transcript 34 from the scrollable list 186 and be presented with the actual transcript 34.

It is noted that, solely for purposes of explanation, certain functionality has been attributed to certain components, such as the down sampler 108, the transcriber 110, the labeler 112, the trainer 114, the text normalizer 134 and the controller 136. However, in practice, the functionality attributed to such components may be implemented in any number of components, or in a single component. It is further noted that solely for purposes of explanation, the functionality has been described as occurring on a single computing device 102, in practice, the functionality may be implemented by any number of computing devices 102 of the computing system 100. Finally, it is noted that, because the components discussed herein are components of a computing device 102 of the computing system 100, the functionality implemented by such components may be attributed generally to the computing system 100. Moreover, in examples where the components comprise software instructions that program the one or more processor devices 104 to carry out functionality discussed herein, functionality implemented by the component may be attributed herein to the one or more processor devices 104.

Figure 9:
FIG. 9 is a block diagram of a computing system suitable for implementing examples disclosed herein.

FIG. 9 is a block diagram of a computing system 100 suitable for implementing examples according to one example. The computing system 100 includes one or more computing devices 102. Each computing device 102 may comprise any computing or electronic device capable of including firmware, hardware, and/or executing software instructions to implement the functionality described herein, such as a computer server, a desktop computing device, or the like. Each computing device 102 includes the processor device 104, the system memory 106, and a system bus 116. The system bus 116 provides an interface for system components including, but not limited to, the system memory 106 and the processor device 104. The processor device 104 can be any commercially available or proprietary processor.

The system bus 116 may be any of several types of bus structures that may further interconnect to a memory bus (with or without a memory controller), a peripheral bus, and/or a local bus using any of a variety of commercially available bus architectures. The system memory 106 may include non-volatile memory 118 (e.g., read-only memory (ROM), erasable programmable read-only memory (EPROM), electrically erasable programmable read-only memory (EEPROM), etc.), and volatile memory 120 (e.g., random-access memory (RAM)). A basic input/output system (BIOS) 122 may be stored in the non-volatile memory 118 and can include the basic routines that help to transfer information between elements within the computing system 100. The volatile memory 120 may also include a high-speed RAM, such as static RAM, for caching data.

The computing system 100 may further include or be coupled to a non-transitory computer-readable storage medium such as a storage device 124, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 124 and other drives associated with computer-readable media and computer-usable media may provide non-volatile storage of data, data structures, computer-executable instructions, and the like.

A number of modules can be stored in the storage device 124 and in the volatile memory 120, including an operating system and one or more program modules, such as the down sampler 108, the transcriber 110, the labeler 112, the trainer 114, the text normalizer 134, and/or the controller 136 which may implement the functionality described herein in whole or in part. All or a portion of the examples may be implemented as a computer program product 126 stored on a transitory or non-transitory computer-usable or computer-readable storage medium, such as the storage device 124, which includes complex programming instructions, such as complex computer-readable program code, to cause the processor device 104 to carry out the steps described herein. Thus, the computer-readable program code can comprise software instructions for implementing the functionality of the examples described herein when executed on the processor device 104.

An operator may also be able to enter one or more configuration commands through a keyboard (not illustrated), a pointing device such as a mouse (not illustrated), or a touch-sensitive surface such as a display device. Such input devices may be connected to the processor device 104 through an input device interface 128 that is coupled to the system bus 116 but can be connected by other interfaces such as a parallel port, an Institute of Electrical and Electronic Engineers (IEEE) 1394 serial port, a Universal Serial Bus (USB) port, an IR interface, and the like. The computing system 100 may also include a communications interface 130 suitable for communicating with a network as appropriate or desired.

Individuals will recognize improvements and modifications to the preferred examples of the disclosure. All such improvements and modifications are considered within the scope of the concepts disclosed herein and the claims that follow.

16

What is claimed is:

1. A method comprising:

obtaining, by a computing system, a plurality of inputs comprising a plurality of unclassified inputs associated with a period of time and a plurality of training inputs associated with the period of time, each unclassified input comprising information associated with a digitized voice signal recording of a second plurality of digitized voice signal recordings, each training input comprising information associated with a digitized voice signal recording of a first plurality of digitized voice signal recordings, each digitized voice signal recording comprising speech signals of a corresponding support call between a technician and a support representative providing support to the technician;

training, by the computing system, a machine-learned support call classification model using the plurality of training inputs to generate classification outputs indicative of a particular support call classification of a plurality of support call classifications for each respective training input based on a loss function that evaluates a difference between the particular support call classification and a ground-truth support call classification associated with each respective training input; and subsequent to training the machine-learned support call classification model, obtaining, by the computing system from the machine-learned support call classification model, a set of support call classifications for each unclassified input of the plurality of unclassified inputs.

2. The method of claim 1, wherein the information associated with the digitized voice signal recording of the first plurality of digitized voice signal recordings comprises the digitized voice signal recording of the first plurality of digitized voice signal recordings.

3. The method of claim 1, wherein the information associated with the digitized voice signal recording of the first plurality of digitized voice signal recordings comprises a dataset comprising one or more textual documents that comprise words spoken during a respective support call between the technician and the support representative.

4. The method of claim 3, further comprising:

generating a plurality of datasets, each dataset comprising one or more textual documents that comprise words spoken during a respective support call between the technician and the support representative by:

inputting, by the computing system, each digitized voice signal recording of the first plurality of digitized voice signal recordings, or a pre-processed digitized voice signal recording that corresponds to the digitized voice signal recording of the first plurality of digitized voice signal recordings, into a transcription process to generate, for each digitized voice signal recording of the first plurality of digitized voice signal recordings, a dataset of the plurality of datasets.

5. The method of claim 4, wherein inputting each digitized voice signal recording of the first plurality of digitized voice signal recordings, or the pre-processed digitized voice signal recording that corresponds to the digitized voice signal recording of the first plurality of digitized voice signal recordings, into the transcription process comprises:

down sampling each digitized voice signal recording to generate the pre-processed digitized voice signal recording; and inputting the pre-processed digitized voice signal recording into the transcription process.

6. The method of claim 1, wherein at least some of the support call classifications correspond to a reason why the technician initiated the corresponding support call with the support representative.

7. The method of claim 1, wherein the training inputs comprise a plurality of subsets of training inputs, each subset of training inputs comprising information associated with digitized voice signal recordings that have been identified as corresponding to a specific support call classification of the plurality of support call classifications.

8. The method of claim 1, wherein obtaining, from the machine-learned support call classification model, the set of support call classifications comprises:

inputting, by the computing system into the machine-learned support call classification model, the plurality of unclassified inputs.

9. The method of claim 1, further comprising:

processing, by the computing system, the set of support call classifications to determine a most occurring support call classification in the set of support call classifications; and presenting, on a display device, information identifying the most occurring support call classification.

10. The method of claim 1, further comprising:

processing, by the computing system, the set of support call classifications to determine a quantity of occurrences of each support call classification of the plurality of support call classifications; and presenting, on a display device, information quantifying the quantity of occurrences of each support call classification of the plurality of support call classifications.

11. A computing system comprising:

one or more computing devices operable to:

obtain a plurality of inputs comprising a plurality of unclassified inputs associated with a period of time and a plurality of training inputs associated with the period of time, each unclassified input comprising information associated with a digitized voice signal recording of a second plurality of digitized voice signal recordings, each training input comprising information associated with a digitized voice signal recording of a first plurality of digitized voice signal recordings, each digitized voice signal recording comprising speech signals of a corresponding support call between a technician and a support representative providing support to the technician;

train a machine-learned support call classification model using the plurality of training inputs to generate classification outputs indicative of a particular support call classification of a plurality of support call classifications for each respective training input based on a loss function that evaluates a difference between the particular support call classification and a ground-truth support call classification associated with each respective training input; and subsequent to training the machine-learned support call classification model, obtain, from the machine-learned support call classification model, a set of support call classifications for each unclassified input of the plurality of unclassified inputs.

12. The computing system of claim 11, wherein the information associated with the digitized voice signal recording of the first plurality of digitized voice signal recordings comprises a dataset comprising one or more textual documents that comprise words spoken during a respective support call between the technician and the support representative.

13. The computing system of claim 12, wherein the one or more computing devices operable to:

generate a plurality of datasets, each dataset comprising one or more textual documents that comprise words spoken during a respective support call between the technician and the support representative by:

inputting each digitized voice signal recording of the first plurality of digitized voice signal recordings, or a pre-processed digitized voice signal recording that corresponds to the digitized voice signal recording of the first plurality of digitized voice signal recordings, into a transcription process to generate, for each digitized voice signal recording of the first plurality of digitized voice signal recordings, a dataset of the plurality of datasets.

14. The computing system of claim 11, wherein the training inputs comprise a plurality of subsets of training inputs, each subset of training inputs comprising information associated with digitized voice signal recordings that have been identified as corresponding to a specific support call classification of the plurality of support call classifications.

15. The computing system of claim 11, wherein to obtain, from the machine-learning support call classification model, the set of support call classifications, the one or more computing devices are further operable to:

input, into the machine-learned support call classification model, the plurality of unclassified inputs.

16. The computing system of claim 11, wherein the one or more computing devices are further operable to:

process the set of support call classifications to determine a most occurring support call classification in the set of support call classifications; and present, on a display device, information identifying the most occurring support call classification.

17. A non-transitory computer-readable storage medium that includes executable instructions operable to cause one or more computing devices to:

obtain a plurality of inputs comprising a plurality of unclassified inputs associated with a period of time and a plurality of training inputs associated with the period of time, each unclassified input comprising information associated with a digitized voice signal recording of a second plurality of digitized voice signal recordings, each training input comprising information associated with a digitized voice signal recording of a first plurality of digitized voice signal recordings, each digitized voice signal recording comprising speech signals of a corresponding support call between a technician and a support representative providing support to the technician;

train a machine-learned support call classification model using the plurality of training inputs to generate classification outputs indicative of a particular support call classification of a plurality of support call classifications for each respective training input based on a loss function that evaluates a difference between the particular support call classification and a ground-truth support call classification associated with each respective training input; and subsequent to training the machine-learned support call classification model, obtain, from the machine-learned support call classification model, a set of support call classifications for each unclassified input of the plurality of unclassified inputs.

18. The non-transitory computer-readable storage medium of claim 17, wherein the information associated with the digitized voice signal recording of the first plurality of digitized voice signal recordings comprises a dataset comprising one or more textual documents that comprise words spoken during a respective support call between the technician and the support representative.

19. The non-transitory computer-readable storage medium of claim 17, wherein to obtain, from the machine-learning support call classification model, the set of support call classifications, the executable instructions are further operable to cause the one or more computing devices to:

input, into the machine-learned support call classification model, a plurality of unclassified inputs.

20. The non-transitory computer-readable storage medium of claim 17, wherein the executable instructions are further operable to cause the one or more computing devices to:

process the set of support call classifications to determine a most occurring support call classification in the set of support call classifications; and present, on a display device, information identifying the most occurring support call classification.

\* \* \* \* \*